United States Patent
Lagerling et al.

(10) Patent No.: US 12,541,704 B2
(45) Date of Patent: Feb. 3, 2026

(54) MACHINE-LEARNING PREDICTION OR SUGGESTION BASED ON OBJECT IDENTIFICATION

(71) Applicant: Mercari, Inc., Palo Alto, CA (US)

(72) Inventors: John Alexander Lagerling, Los Altos Hills, CA (US); Byong Mok Oh, Los Altos, CA (US); Fritz Mikio Kuribayashi, Tokyo (JP); Takuma Yamaguchi, Saitama (JP); Rishabh Kumar Shrivastava, Tokyo (JP); Takaya Ukai, Tokyo (JP); Viswakumar Sukeesh Babu, Tokyo (JP)

(73) Assignee: Mercari, Inc., Palo Alto, CA (US)

( * ) Notice: Subject to any disclaimer, the term of this patent is extended or adjusted under 35 U.S.C. 154(b) by 903 days.

(21) Appl. No.: 17/007,438

(22) Filed: Aug. 31, 2020

(65) Prior Publication Data

US 2022/0067571 A1 Mar. 3, 2022

(51) Int. Cl.
*G06N 20/00* (2019.01)
*G06F 16/23* (2019.01)
(Continued)

(52) U.S. Cl.
CPC ........... *G06N 20/00* (2019.01); *G06F 16/235* (2019.01); *G06N 5/022* (2013.01); *G06Q 30/0206* (2013.01)

(58) Field of Classification Search
CPC ........ G06N 20/00; G06N 20/10; G06N 20/20; G06N 5/00; G06N 5/02; G06N 5/022; G06N 5/025; G06N 5/04
See application file for complete search history.

(56) References Cited

U.S. PATENT DOCUMENTS

| 7,970,713 B1 * | 6/2011 | Gorelik | G06Q 30/06 |
| | | | 705/7.29 |
| 8,374,906 B1 * | 2/2013 | Williams | G06Q 30/02 |
| | | | 705/400 |

(Continued)

FOREIGN PATENT DOCUMENTS

| JP | 2008502963 A | * | 1/2008 | ............. G06Q 40/04 |
| JP | 2019215778 A | | 12/2019 | |
| KR | 20200005269 A | * | 1/2020 | ............. G06Q 30/08 |

OTHER PUBLICATIONS

Machine translated version of JP2008502963A pp. 3-5 (Year: 2008).*

(Continued)

*Primary Examiner* — Adam C Standke
(74) *Attorney, Agent, or Firm* — Sterne, Kessler, Goldstein & Fox P.L.L.C.

(57) ABSTRACT

Disclosed herein are system, computer-program product (non-transitory computer-readable medium), and method embodiments for machine-learning prediction or suggestion based on object identification. A system including at least one processor may be configured to cross-reference an identifier of a selected object with a list of known unique identifiers. The selected object may be selected via received selection. The at least one processor may further retrieve a set of values associated with the identifier of the selected object, upon determining that the list of known unique identifiers includes the identifier of the selected object, and perform machine-learning to derive a predicted-value set based at least in part on the set of values associated with the identifier of the selected object and a category applicable to the selected object. The at least one processor may determine that the predicted-value set satisfies a predetermined confidence condition, and output at least part of the predicted-value set.

20 Claims, 13 Drawing Sheets

(51) Int. Cl.
*G06N 5/022* (2023.01)
*G06Q 30/0201* (2023.01)

(56) References Cited

U.S. PATENT DOCUMENTS

| | | | |
|---|---|---|---|
| 10,657,375 B1* | 5/2020 | Edwards | G06V 10/82 |
| 2009/0063251 A1* | 3/2009 | Rangarajan | G06Q 30/02 |
| | | | 705/7.31 |
| 2015/0161636 A1 | 6/2015 | Williams et al. | |
| 2016/0292751 A1* | 10/2016 | Hartman | G06Q 30/0283 |
| 2018/0096420 A1 | 4/2018 | Sun et al. | |
| 2019/0311301 A1* | 10/2019 | Pyati | G06F 16/901 |
| 2021/0272304 A1* | 9/2021 | Yang | G06V 10/454 |

OTHER PUBLICATIONS

Machine translated version of KR20200005269A pp. 1-10 (Year: 2020).*

International Search Reportand Written Opinion of the International Searching Authority directed to related International Patent Application No. PCT/US2021/048232, mailed Dec. 23, 2021; 7 pages.

* cited by examiner $$f(x) = \frac{M-m}{1+e^{k(x-x_0)}} + m$$

$M = max\ value = 6$ $k = steepness = 10$ $x_0 = sigmoid\ midpoint = 0.5$ $m = min\ value = 1$ $$x = \frac{\|price - price\_suggest_{min}\|}{price\_suggest_{max} - price\_suggest_{min}}$$

1200

```
┌─────────────────────────────────────────────────────────────────────────────┐
│ Cross-reference an identifier of a selected object with a list of known     │
│ unique identifiers, the selected object is being selected via a received    │
│ selection                                                                   │
│                                   1202                                      │
└─────────────────────────────────────────────────────────────────────────────┘
                                      │
                                      ▼
┌─────────────────────────────────────────────────────────────────────────────┐
│ Retrieve, from at least one database, a set of values associated with the   │
│ identifier of the selected object, upon determining that the list of known  │
│ unique identifiers comprises the identifier of the selected object          │
│                                   1204                                      │
└─────────────────────────────────────────────────────────────────────────────┘
                                      │
                                      ▼
┌─────────────────────────────────────────────────────────────────────────────┐
│ Perform at least one ML algorithm to derive a predicted-value set based at  │
│ least in part on the set of values associated with the identifier of the    │
│ selected object, and based at least in part on at least one category        │
│ applicable to the selected object                                           │
│                                   1206                                      │
└─────────────────────────────────────────────────────────────────────────────┘
                                      │
                                      ▼
┌─────────────────────────────────────────────────────────────────────────────┐
│ Determine that the predicted-value set satisfies a predetermined confidence │
│ condition                                                                   │
│                                   1208                                      │
└─────────────────────────────────────────────────────────────────────────────┘
                                      │
                                      ▼
┌─────────────────────────────────────────────────────────────────────────────┐
│ Output at least part of the predicted-value set                             │
│                                   1210                                      │
└─────────────────────────────────────────────────────────────────────────────┘
```

FIG. 12

MACHINE-LEARNING PREDICTION OR SUGGESTION BASED ON OBJECT IDENTIFICATION

BACKGROUND

When selling a given item via an online platform, a user of the platform who wishes to sell the item may have difficulty attracting potential buyers while the item is listed for sale. For example, such difficulties may arise from a user's inexperience with selling in general, or with selling items like the item for sale, giving rise to unreasonable expectations of how much money will result from a sale and how much time will be needed between listing and closing. Separately, the user's difficulties may arise from unfamiliarity with the platform itself. Possibly on top of these other factors, the user may unwittingly misidentify the object for sale.

As a result of these problems, sales may ultimately be slow or may not close in a necessary time frame. Any number of these problems may have a compounding effect, resulting in the user's frustration, which may in turn lead to the user overcompensating with price reductions, potentially leading to further frustration. Over time, such users may disengage or defect from the platform, resulting in fewer listings for the platform and reduced interest in the platform from other users who would be potential buyers of items listed for sale on the platform.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIG. 12 is a flowchart illustrating a method including machine-learning prediction or suggestion based on object identification, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for machine-learning prediction or suggestion based on object identification, and/or any combination thereof. For the purposes of this application, in some embodiments, predicted values or ranges of predicted values may serve as suggestions or recommendations, such as of sale prices for example.

Figure 1:
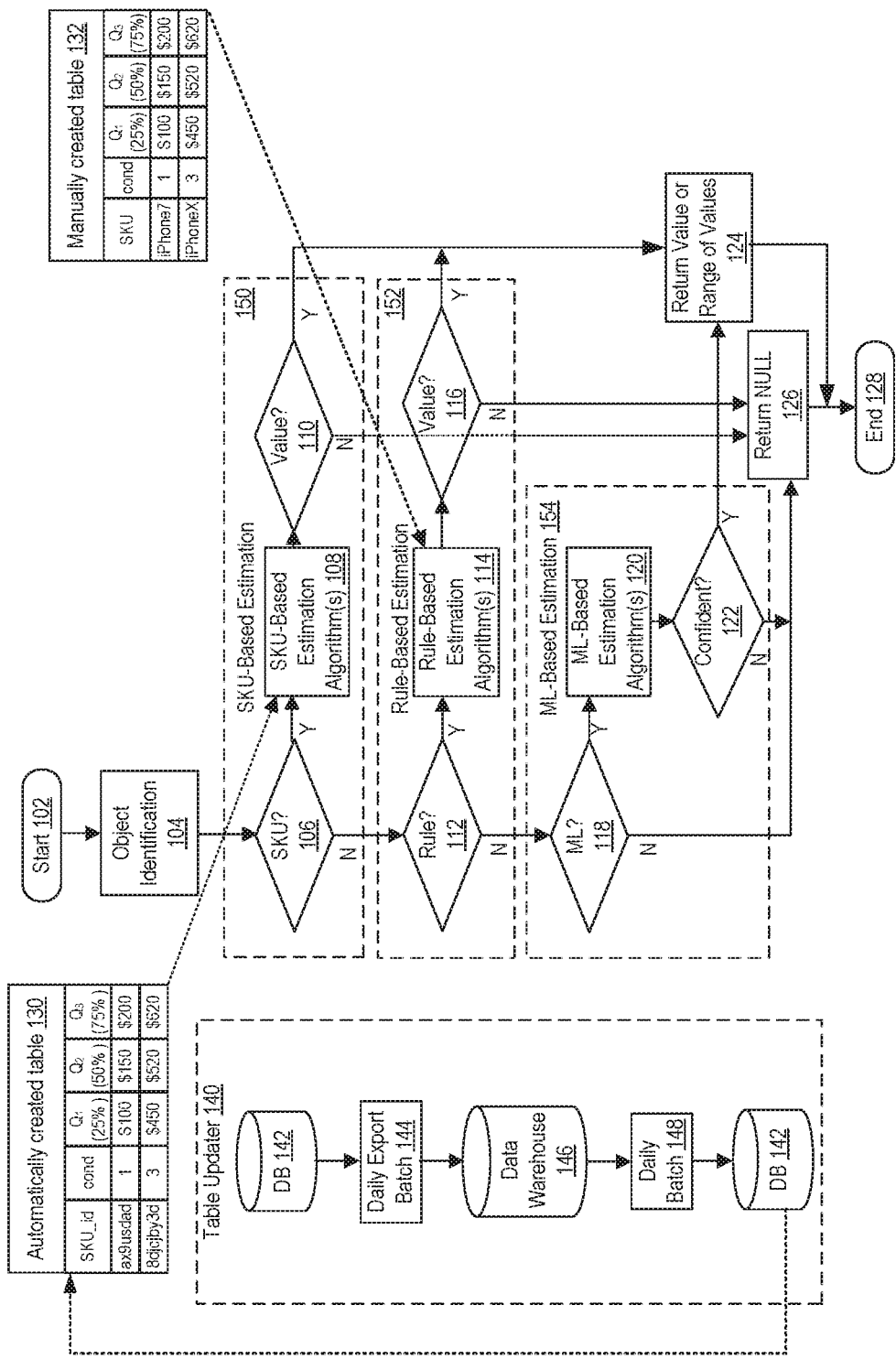
FIG. 1 depicts structure and function of an example system useful for implementing methods including machine-learning prediction or suggestion based on object identification, according to some embodiments.

FIG. 1 is a diagram showing structure and function of an example system 100 useful for implementing methods including machine-learning prediction or suggestion based on object identification, according to some embodiments.

On the left-hand side of FIG. 1 is a representation of an example subsystem functioning as a table updater 140, which may include or otherwise have access to at least one of a database (DB) 142 and/or a data warehouse 146, from which selected data may be exported or retrieved in batches, e.g., daily export batch 144 and daily export batch 148. While this example provides for daily updates, any periodic interval (e.g., hourly, weekly, etc.) or ad hoc access may be provided, according to some embodiments. Based at least in part on any of the data accessible to table updater 140, such as from a data flow depicted in FIG. 1 at the table updater 140, lists or tables of data may be created, such as automatically created table 130.

In this non-limiting example embodiment, data in automatically created table 130 may include rows, columns, keys, elements, etc., as understood with other database tables. A column or key may correspond to a unique identifier (UID) of a product, such as may be a stock-keeping unit (SKU), for example, accompanied by other fields, columns, keys, elements, etc., corresponding to prices, statistics, conditions (new, used, good, fair, etc.), or other metrics. For example, there may be separate columns for each of first quartile ($Q_1$), median ($Q_2$), third quartile ($Q_3$), or other composite statistics of cleared sale prices corresponding to a given unique identifier within a given time period, according to some embodiments. Similar corresponding schemata and data may also be present in a manually created table 132, as shown on the right-hand side.

Based at least in part on processing these values, and possibly other platform statistics or performance indicators, a value may be estimated for a prediction or recommendation, which may correspond to a suggested price, in some embodiments. Additionally, certain other values may be generated, such as a minimum and/or maximum value defining a range of values around to the estimated value, thus corresponding to a predicted or recommended range of suggested prices generated from the estimated or predicted value, according to further embodiments.

At the start 102 of a function or method of using system 100, an execution flow may move to an object identification module 104, e.g., to associate or attempt to associate actual objects with unique identifiers, such as any that may be keys in database tables, e.g., 130 or 132, according to some embodiments. Additional information about object identification can be found disclosed elsewhere herein, such as with respect to items 902-904 of FIG. 9.

Execution may proceed to a conditional evaluation at 106. If a unique identifier can be found to identify a given object, then execution may proceed to UID-based or SKU-based estimation algorithms 108, which may be part of a UID-based or SKU-based estimation module 150, in some embodiments. Otherwise, execution may proceed to a subsequent conditional evaluation at 112, to determine whether a rule or rule-based estimation algorithm(s) 114 may exist or be applicable to a particular output of object identification module 104, to perform rule-based estimation. If so, rule-based algorithm(s) 114 may be performed, which may be in accordance with rule-based estimation module 152. Otherwise, execution may proceed to at least one other evaluation, such as 118, to determine availability or applicability of machine learning (ML) to the particular output of object identification module 104. Additionally, or alternatively, execution may flow to a statistics-based evaluation algorithm as part of a statistics-based evaluation module (not shown), which may generate as final or intermediate output, or accept as input from tables 130 or 132, statistical data, which may include processed composites of historical data for a given output of object identification module 104 (e.g., mean, range, $Q_1$, $Q_2$, $Q_3$, etc.).

Again discussing 108, if execution has flowed to UID-based or SKU-based estimation algorithm(s) 108 for a particular output of object identification module 104, an estimation (prediction, suggestion, etc.) may be performed, to return a value 110 at 124, and end 128. Otherwise, absent a valid value, 108 may return NULL at 126. It is possible, in some embodiments, that no value is returned if proceeding to 126, and then immediately to 128. In other embodiments (not shown), a NULL return from 108-110 may result in proceeding to 112 to determine whether a rule exists, and/or to 118, for ML such as in ML-based estimation module 124 (discussed further below), or to another estimation module, such as a statistics-based estimation module (not shown), for example.

Again discussing 112, if execution has flowed to rule-based estimation algorithm(s) 114 for a particular output of object identification module 104, an estimation (prediction, suggestion, etc.) may be performed, to return a value 116 at 124, and end 128. Otherwise, absent a valid value, 114 may return NULL at 126. It is possible, in some embodiments, that no value is returned if proceeding to 126, and then immediately to 128. Additionally, or alternatively, a range of values may be generated around the returned value 116. In other embodiments (not shown), a NULL return from 114-116 may result in proceeding to 118 for ML such as in ML-based estimation module 124 (discussed further below), or to another estimation module, such as a statistics-based estimation module (not shown), for example.

Again discussing 118, if execution has flowed to ML-based estimation algorithm(s) 120 for a particular output of object identification module 104, an estimation (prediction, suggestion, etc.) may be performed. To compensate for any potential unreliability in ML-based estimation algorithm(s) 120, a predetermined confidence condition 122 may be checked, to determine whether the predicted value or predicted-value set satisfies the predetermined confidence condition 122. If so, a value may be returned at 124 and end 128 execution of a given function or method for a given output of object identification module 104. If the confidence condition is not satisfied, ML-based estimation algorithm(s) 120 may return NULL at 126. Additionally, or alternatively, a range of values may be generated around the returned value 116. In other embodiments (not shown), a NULL return from 114-116 may result in proceeding to another estimation module, such as a statistics-based estimation module (not shown), for example.

Additionally or alternatively, depending on which is more efficient or depending on other factors, any of modules 150-154 (or others) may be run in parallel, for potentially quicker resolution, in some embodiments. In other embodiments, logic may be sequential and short-circuited, such that if a value is returned from 150, even if NULL, no performance of other estimation algorithms are attempted.

Together, the components shown in FIG. 1, among others, may be treated as making up an example system 100, which may handle operations from storing, retrieving, and/or calculating data (item data, metadata, listings, databases, etc.) on backend infrastructure, and processing any user input, output, results, and related interaction on the frontend.

Beyond interaction with a user (e.g., seller) at the frontend, the backend may process input from a user and/or a variety of other sources. For example, if a seller provides input regarding an item for a new listing (e.g., photographs, price ranges, or input requesting price suggestions), the backend may seek to confirm, via other input, an identification of what the seller is attempting to list. The other input may be prompted from the seller, automatically derived from other sources, or a combination of both, in some embodiments.

In order to identify an object, associate it with a given UID or SKU, and/or provide a suggested price recommendation (single value or range of values), the backend may do any of the following, in any order: check against old listings in a backend database of listings, e.g., on the same platform; check against feed data of data partners, e.g., via a subscription service between the same platform and a third-party provider; check against scraped listings from public sources, e.g., other e-commerce websites including other consumer-to-consumer (C2C) platforms, business-to-consumer (B2C) consignment sites, and/or retail platforms; and confirm with the seller, including prompting for input to confirm whether any information, retrieved from any combination there above, is accurate according to the seller, at any stage of such process(es) described here.

For example, in embodiments or use cases where object identification may involve textual input, speech-to-text input/output, photographs of text (e.g., via optical character recognition (OCR) or other computer-vision means), object identification module 104 may include use of natural language processing (NLP) techniques. NLP may further include determining synonyms (including any abbreviations, acronyms, contractions, or expansions, e.g., by a synonym library or lookup table) and further searching to match any synonyms found, determining and/or further searching any other semantically related words for additional matching, performing word stemming based on least one language and corresponding morphological rule set(s), determining misspellings and equating the misspellings with correct spellings (or otherwise correcting misspellings) for additional matching, and so on for similar processing. Thus, object identification may involve some degree of matching, for example, and may be recursive, in some embodiments. Using similar linguistic analysis of inputs or item descriptions, modifier terms, e.g., adjectives describing size or color, may be separated from other nominal identifier terms, e.g., names or nouns specifying an item.

Additionally, object identification may be performed, such as by object identification module 104, not only for generic terms or categorical descriptions, but also for proper nouns, e.g., brand names, genericized trademarks, etc. Classifier algorithms, in some embodiments, or other neural networks or artificial intelligence may be used to extract relevant terms from unstructured word sets such as search queries, user input, or item descriptions retrieved from techniques mentioned above.

Thus, system 100 classifier may "understand" from a given unstructured word set what terms may be intended as brand names versus generic descriptions, and may be configured to update any database, library, or lookup table, etc., to include brand information in specific categories or subcategories together with generic terms, for example, to improve matching. Object identification algorithms or matching algorithms or any components thereof may be biased or tuned for precision or recall.

In some embodiments, such matching as described above may be performed locally on a client device, e.g., personal computer (PC) or mobile device such as a smartphone or tablet computer, remotely on self-hosted service (including dedicated server(s), virtual private server (VPS), or on-premises cloud) infrastructure, remotely via third-party services, or any combination thereof. In embodiments where the matching operations may be performed via multiple devices, certain matching operations may be performed locally, with intermediate results being delivered to remote services for confirmation, validation, other additional processing, or any combination thereof. Any local or cloud-based solutions may further include virtualization and shared computing resources, including general-purpose graphics processing units (GPGPU) shared among virtual machines, containers, jails, zones, groups, namespaces, or other equivalent architectures for virtualization, isolation, resource sharing, and any combination thereof.

In an embodiment, one way to identify items or types of items may be to resolve a proposed new listing to correspond to a unique identifier, such as by comparison to items already mapped to unique identifiers, for example. Information on items confirmed in this manner may then correlate more reliably with information of other comparable items listed in the backend database or with other sources, for example.

At the initial input stage, or at any subsequent input stage, system 100 may seek additional user input via the app, for example. Input may be text in the form of a character string, a photographic image, voice recognition, other characteristic sounds or audio fingerprints, for example. Text-based input via the app may prompt a user for a few fields of information depending on a broad category of the item to be listed for sale, rather than an exhaustive description of all features. In many cases, even basic text information may allow the backend to resolve SKU-level data, or at least present a few likely candidate items to a seller for confirmation of the correct item identification.

Aside from text-based strings or images, a mathematical or cryptographic signature in any representation may also be used. Barcodes or other patterns or sequences may be used. Other possible types of input include, without limitation, vibrational patterns, chemical samples and analysis thereof, measurements of radiation, electrical and/or magnetic signals, or any other environmental sensor input, etc.

Other forms of input may be received, such as in the form of output from other computer programs or algorithms, e.g., neural network output, perceptron output, image recognition output, classification output, or other types of output. These outputs may be based on other user inputs, e.g., from photographic data, voice or audio data, or other third-party resources, feeds, etc. Any or all such input may be generated by a mobile device, such as a tablet computer or smartphone, in some embodiments.

In a case of image input, a user attempting to create a new listing for sale may be prompted to take at least one photograph of the item to be listed. Photographic image data from the photograph(s) may be processed locally on the device running the app, or may be transmitted to the backend or to a third party for initial processing and/or further processing. Processing of the photographic image data may include use of artificial intelligence. Processing of the image data may include feeding the image data into a neural network, perceptron, or classifier, for example. The image data may be processed using computer-implemented image recognition, such as using at least one computer vision algorithm, in some embodiments. Any of the above technologies or their equivalents may be used to perform operations such as classification, object recognition and/or reverse image-searching, to name a few non-limiting examples.

As may be used with machine learning (ML), for purposes of this application, any neural networks described herein may include at least one artificial neural network (ANN). The ANN(s) may include at least one of a feedforward neural network, a recurrent neural network, a modular neural network, or a memory network, to name a few non-limiting examples. In the case of a feedforward neural network, for example, this may further correspond to at least one of a convolutional neural network, a probabilistic neural network, a time-delay neural network, a multi-layer perceptron, an autoencoder, or any combination thereof, in some embodiments. Such ANNs may have multiple layers—in some embodiments, the layers may be densely connected, such as in cases where activation functions may be reused from certain layers or where activation of one or more layers is skipped to resolve certain calculations, in some embodiments.

In further embodiments based on convolutional neural network (CNN) processing, for example, such CNNs may further integrate at least some filters (e.g., edge filters, horizon filters, color filters, etc.). These filters may include, for example, some of the edge detection algorithms, color filtering algorithms, and/or predetermined thresholds. For desired results, a given ANN, including a CNN, may be designed, customized, and/or modified in various ways, for example, according to several criteria, according to some embodiments.

Image-based object recognition here may also leverage machine learning, in some embodiments. Systems for image-based object recognition (which may be referred to as "image recognition" in some cases) may be trained using any of backend database listings, feed data of data partners, scraped listings from public sources, or any other source of accurate training data, for example.

Image-based object recognition may be further configured to detect and interpret barcodes, Quick Response (QR) codes, labels, tags, logos, trademarks, and/or any other defining characteristic of an item. Image-based object recognition may additionally perform optical character recognition (OCR) and interpret text using natural language processing (NLP), in some embodiments. Thus, image-based object recognition may be used to identify listed items, or at least candidate items for confirmation and selection, and may update selected items based on new information and calculations that may be subsequently introduced via various input sources.

Once system 100 "understands" what an item is, such as by machine learning or other artificial intelligence, object recognition, or any other means available to system 100, additional calculations may be performed, such as to analyze and categorize the items based on other data or corresponding metadata, such as price, condition (new, used, good, fair, etc.) marketability trends, etc.

Figure 2:
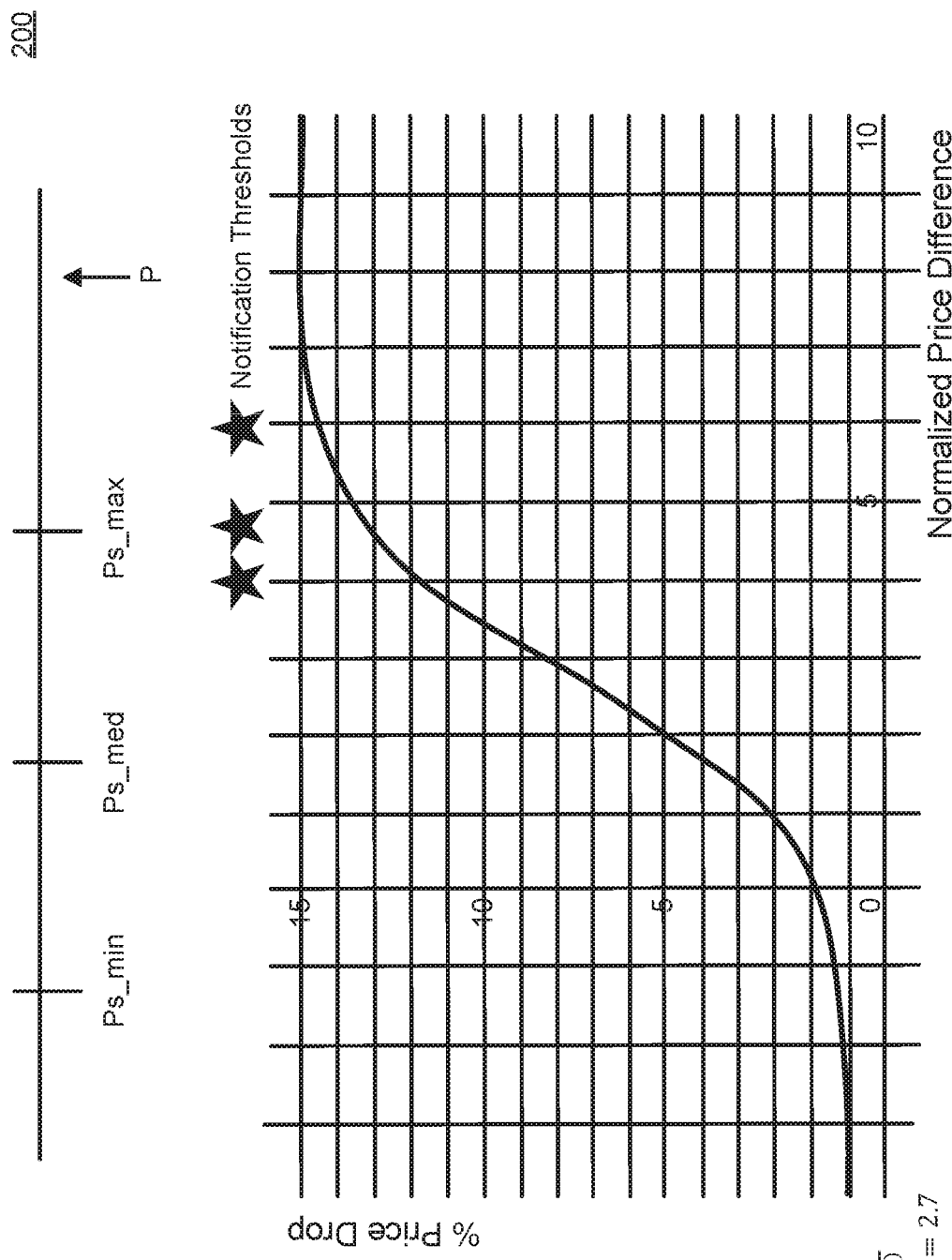
FIG. 2 depicts an aspect of a prediction, such as for programmatically suggesting or recommending a value or range of values, according to some embodiments.

FIG. 2 depicts an aspect of a prediction, such as for programmatically suggesting or recommending a value or range of values, according to some embodiments.

The graph 200 in FIG. 2 depicts a suggested relative price drop of a listing as a function of normalized price difference with respect to actual sale prices for similar objects, represented by x. As part of this price-drop-suggestion function, various factors may be considered, such as a maximum drop ($D_{max}$) for suggested price as a percentage drop from a given price P, and a steepness factor (k) with midpoint shift value ($x_0$) of a sigmoid curve or similar curve, such as in a logistic function provided by the following equation:

$$f(x) = \frac{D_{max}}{1 + e^{-k(x-x_0)}}.$$

The particular curve shown in FIG. 2 is drawn with $D_{max}$ equal to 15%, k equal to 1, and $x_0$ equal to 2.7, but other values may be used according to different use cases.

Here, independent variable x may represent a normalized price difference, which may be provided in some embodiments by a relationship of a given price value (e.g., input for prediction of sale frequency or probability based on a given price P) with respect endpoints of a range of suggested prices, e.g., maximum observed sale price ($P_{s\_max}$) and minimum observed sale price ($P_{s\_min}$) for similar objects. Thus, for some example use cases, normalized price difference x may be defined as $$\frac{P - P_{s\_min}}{P_{s\_max} - P_{s\_min}}.$$

Although the example of FIG. 2 uses a logistic function, any other equivalent or similar functions may be used. Other non-limiting examples include decay functions, trigonometric functions, spline curves, exponential functions, logarithmic functions, or other functions that may suitably predict a value in a particular model and/or be used to generate a range of values around the predicted value, according to a given use case.

In an example of a practical application of such a curve, if a given price (e.g., based on arbitrary user input when creating a listing of an item for sale) results in a prediction that a sale is unlikely (e.g., because similar items have not sold at or above the given price), a lower price may be suggested while the item is listed for sale, within a specified maximum drop, according to some implementations.

If a recommended drop exceeds a given threshold, for example, if the price drop is sufficiently near, at, or above the specified maximum price drop, the seller may be notified, e.g., via a push notification, that the price may be too high to sell, that the price should be dropped, that the price will be automatically dropped, and/or at that the price exceeds at least one threshold, any of which may be specified in a notification. Some examples of potential price points for notifications are shown in FIG. 2.

Additionally, or alternatively, output may include a qualitative suggestion, e.g., that the sale may be slow or may not happen, and/or a general indication that a lower price may be more likely to sell, with or without a specific value or range of values for suggested price. In some embodiments, a frequency chart or probability density curve may be displayed, in addition to, or instead of, any of the above outputs. If, on the other hand, the given price is lower than a majority of other observed sale prices, some embodiments may provide a suggestion to raise the price to increase proceeds, a suggestion to lower the price further in order to close a sale even more quickly, or a combination thereof, for example.

Figure 3:
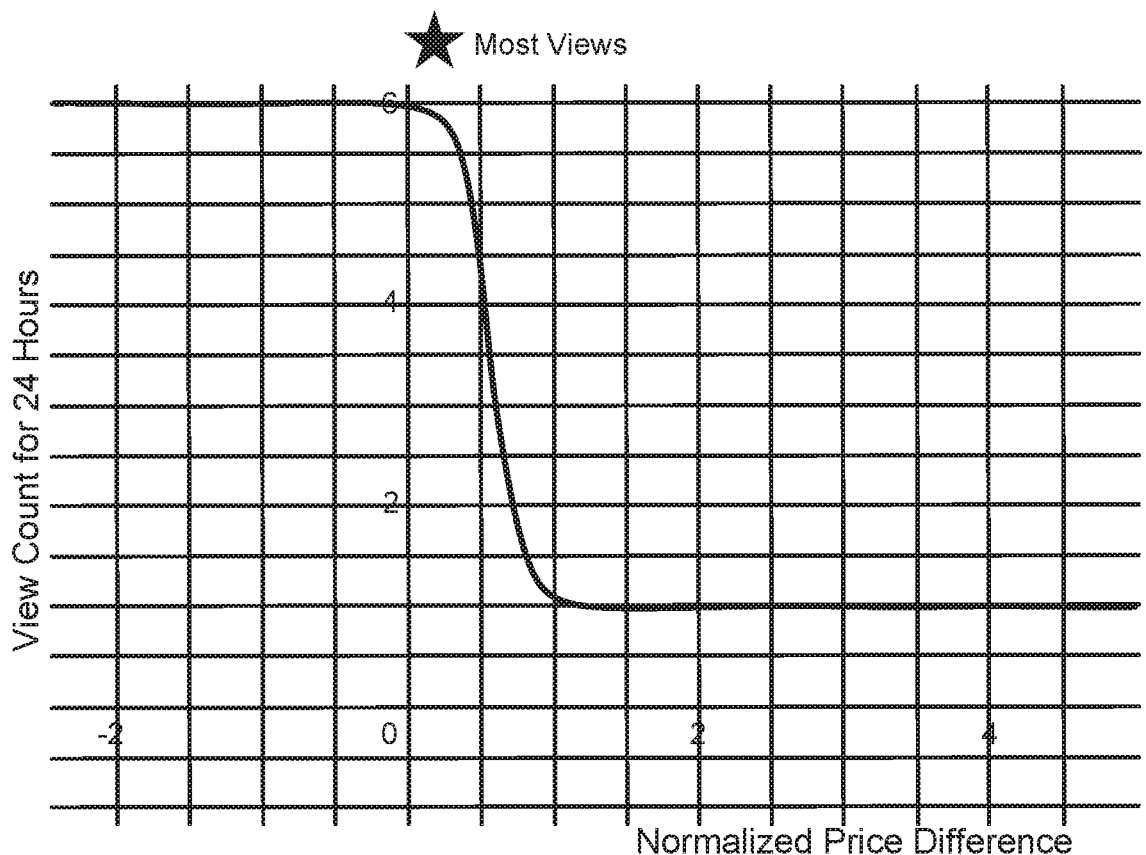
FIG. 3 depicts a further aspect of prediction, such as for programmatically suggesting or recommending a value or range of values with further consideration of other factors, according to some embodiments.

FIG. 3 depicts a further aspect of prediction, such as for programmatically suggesting or recommending a value or range of values with further consideration of other factors, according to some embodiments.

The graph 300 in FIG. 3 depicts a predicted number of views of a listing as a function of normalized price difference with respect to a suggested price or generated price range, represented by x. As part of this views-prediction function, various factors may be considered, such as a maximum expected value (M) and minimum expected value (m) for views, and a steepness factor (k) with midpoint value ($x_0$) of a sigmoid curve or similar curve, such as in a logistic function provided by the following equation:

$$f(x) = \frac{M - m}{1 + e^{k(x-x_0)}} + m.$$

The particular curve shown in FIG. 3 is drawn with M equal to 6, m equal to 1, k equal to 10, and $x_0$ equal to 0.5, but other values may be used according to different use cases.

Here, independent variable x may represent a normalized price difference, which may be provided in some embodiments by a relationship of a given price value (e.g., input for prediction of a number of views based on a given price) with respect endpoints of a range of suggested prices, e.g., maximum suggested price ($price\_suggest_{max}$) and minimum suggested price ($price\_suggest_{min}$) for a given object. Thus, for some example use cases, normalized price difference x may be defined as $$\frac{\|price - price\_suggest_{min}\|}{price\_suggest_{max} - price\_suggest_{min}}.$$

Although the example of FIG. 3 uses a logistic function, any other equivalent or similar functions may be used. Other non-limiting examples include decay functions, trigonometric functions, spline curves, exponential functions, logarithmic functions, or other functions that may suitably predict a value in a particular model and/or be used to generate a range of values around the predicted value, according to a given use case.

In an example of a practical application of such a curve, if a given price (e.g., based on arbitrary user input when creating a listing of an item for sale) results in a prediction that a lower price would result in more views (and presumably earlier sale as a result), a lower price may be suggested, within a predetermined range, according to some implementations.

Figure 4:
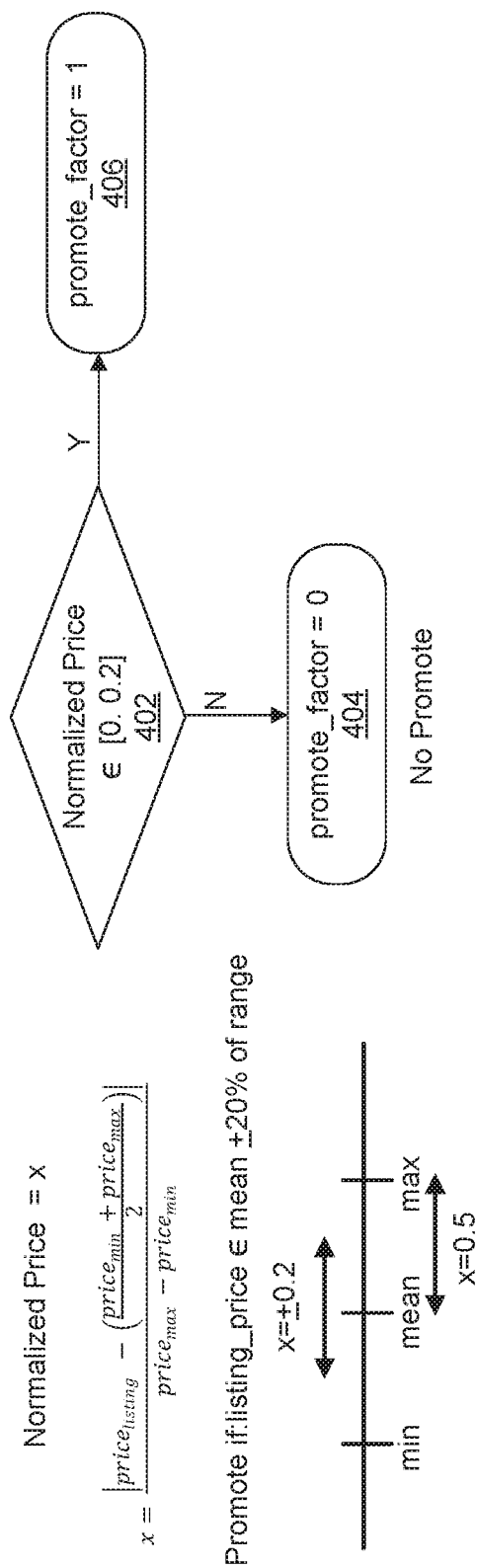
FIG. 4 depicts one level of potential promotion of a listing based on a normalized value or range of values, according to some embodiments.
Figure 5:
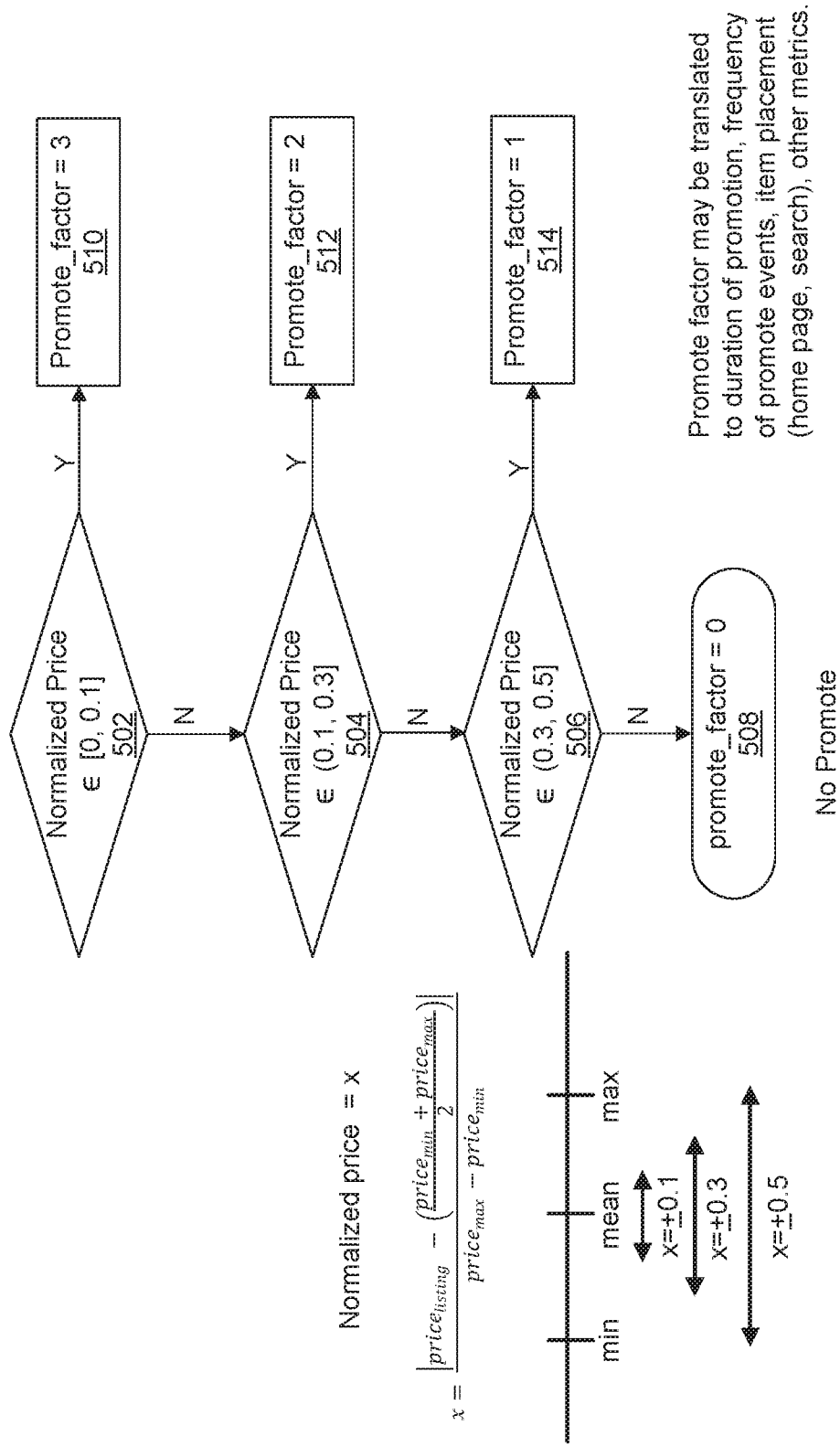
FIG. 5 depicts multiple levels of potential promotion of a listing based on a normalized value or range of values, according to some embodiments.

Additionally, or alternatively, depending on where the given price is on the curve, the listing for the given price may be promoted on the marketplace platform(s) where the item is listed, such as in FIGS. 4 and 5. In further embodiments, position along a curve may determine an extent of how much to promote a listing based on price, such as in FIG. 5. FIGS. 4 and 5 are discussed further below.

Moreover, similar to the notifications as described with respect to FIG. 2, if a price has not been automatically lowered after a number of views has peaked (e.g., at a point of "most views" as shown in FIG. 3) and has declined beyond a threshold, a seller may be prompted to lower the price (or to activate a smart-pricing feature such that price is automatically lowered), with the expected benefit of increasing views and potentially increasing likelihood of a sale, according to some embodiments.

Additionally, or alternatively, output may include a qualitative suggestion, e.g., that the sale may be slow or may not happen, and/or a general indication that a lower price may be more likely to sell or be viewed by more potential buyers, with or without a specific value or range of values for suggested price. In some embodiments, a frequency chart or probability density curve may be displayed, in addition to, or instead of, any of the above outputs. If, on the other hand, a higher price is estimated to receive more views, some embodiments may provide a suggestion to raise the price to increase proceeds and/or to close a sale even more quickly, for example.

FIG. 4 depicts one level of potential promotion of a listing based on a normalized value or range of values, according to some embodiments.

The logic flow diagram 400 shows when, for some embodiments, a promotion factor may be adjusted based on proximity of an existing listing price to a range of prices, such as suggested prices. For example, if a user-provided listing price is in a range that would have been generated around a predicted value as a suggested price range, e.g., for the same or similar items as listed, at which a sale is relatively likely to occur quickly, a listing platform may promote (e.g., increase a likelihood of hits in a search engine or frequency of recommendations of similar products, etc.) the listed item by a given factor, e.g., 1. This may happen if a normalized price is within 20% of a mean value of a range of suggested prices, as shown in FIG. 4. In some use cases, promotion may be a reward for a user who accepts a suggested price from the listing platform, which may further reduce time to sale, likely leading to favorable engagement of the user with the platform.

Thus, as shown in FIG. 4, x may be defined as $$\frac{\left| \text{price}_{listing} - \left( \frac{\text{price}_{min} + \text{price}_{max}}{2} \right) \right|}{\text{price}_{max} - \text{price}_{min}}$$

to represent normalized price with respect to a range of prices. If, for a given listing price, x is within 20% of the mean value (402), a corresponding listing may be promoted on a given platform (406). Where a highest observed sale price may be 50% over the mean, a listing price of 40% over the mean may not receive any additional promotion factor (404), according to this example use case.

FIG. 5 depicts multiple levels of potential promotion of a listing based on a normalized value or range of values, according to some embodiments.

The logic flow diagram 500 shows when, for some embodiments, a promotion factor may be adjusted based on proximity of an existing listing price to a range of prices, such as suggested prices. For example, if a user-provided listing price is in a range that would have been suggested, e.g., for the same or similar items as listed, at which a sale is relatively likely to occur quickly, a listing platform may promote (e.g., increase a likelihood of hits in a search engine or frequency of recommendations of similar products, etc.) the listed item by a given factor, e.g., 3. This may happen if a normalized price is within 10% of a mean value of a range of suggested prices, as shown in FIG. 5. Other degrees of promotion factors (e.g., 2 or 1, etc.) may be provided within different or wider ranges from the mean value. In some use cases, promotion may be a reward for a user who accepts a suggested price from the listing platform, which may further reduce time to sale, likely leading to favorable engagement of the user with the platform.

Thus, as shown in FIGS. 4 and 5, x may be defined as $$\frac{\left| \text{price}_{listing} - \left( \frac{\text{price}_{min} + \text{price}_{max}}{2} \right) \right|}{\text{price}_{max} - \text{price}_{min}}$$

to represent the normalized price with respect to a range of prices. If, for a given listing price, x is within 10% of the mean value (502), a corresponding listing may be promoted on a given platform, by a factor of 3 (510). If, for a given listing price, x is within 20% of the mean, as greater than 10% but not greater than 30% (504), a corresponding listing may also be promoted, but the promotion instead may be by a factor of 2 (512) instead of 3. A listing price of 40% over the mean, as greater than 30% but not greater than 50% (506), may be promoted by a factor of 1 (514) instead of 2 or 3, whereas a listing price more than 50% over the mean may not receive any additional promotion factor (508), according to this example use case. This type of promotion arrangement may provide graduated rewards to modify behavior of platform users listing items for sale, particularly to encourage certain behavior of accepting recommendations likely to reduce time between listing and sale.

Figure 6:
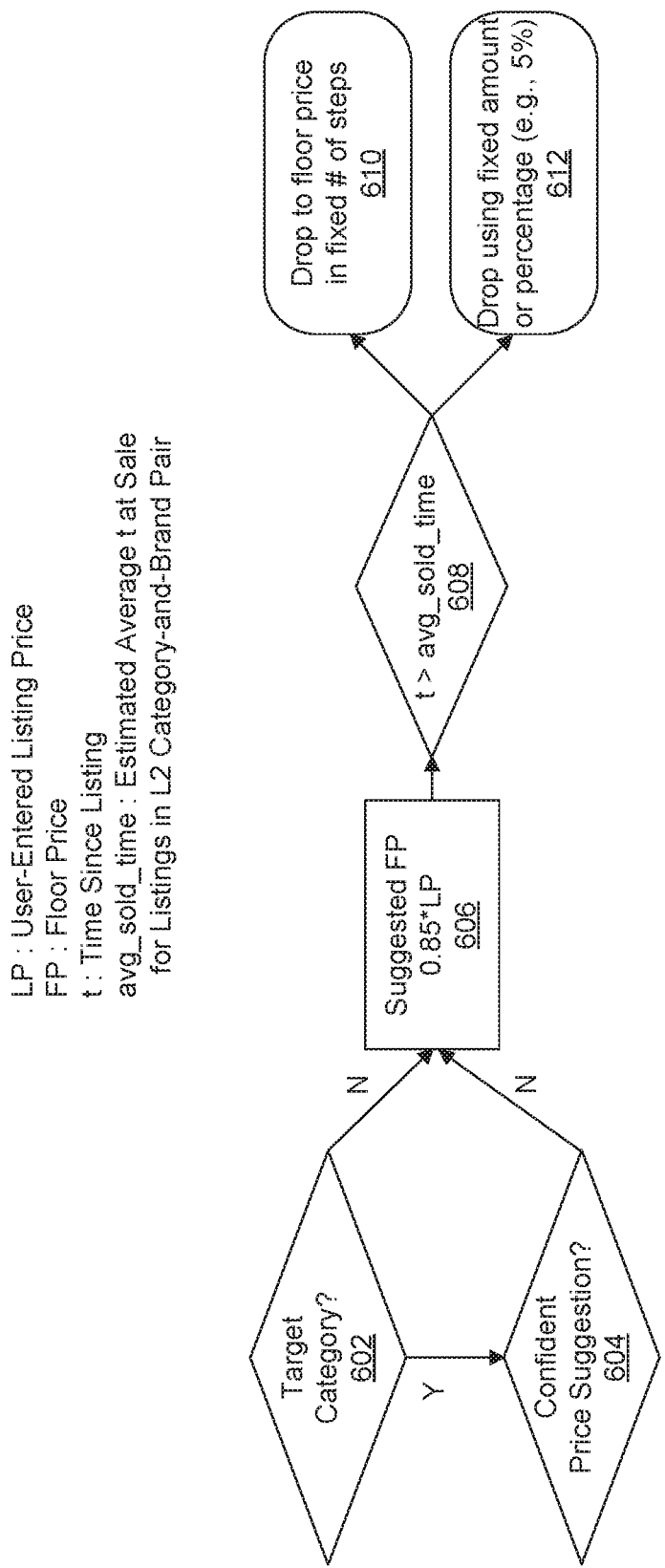
FIG. 6 depicts a logic flow for invoking use of any of multiple alternate systems of suggesting or recommending at least one next value, in the absence of a confident price suggestion in a target category, according to some embodiments.

FIG. 6 depicts a logic flow for invoking use of any of multiple alternate systems of suggesting or recommending at least one next value, in the absence of a confident price suggestion in a target category, according to some embodiments.

The logic flow diagram 600 shows an example of programmatic price reduction, automatically dropping the price of an item listed for sale after a certain amount of time has elapsed since the item was listed for sale (age of the listing, which may correspond to an age of a listed value absent any price drop). Specifically, in this example, when certain conditions are met, e.g., outside of a certain target category (602) or categories of items, and no confident price suggestion exists for a given category, in other words, where there is no a price suggestion satisfying a predetermined confidence condition (604) within a confidence interval for closing the sale within a particular time window, a floor price (FP) may be suggested (606). In this particular example, the first suggestion of a price floor is at 85% of the user-entered listing price, but other default values may be used in other implementations. In some embodiments, the suggested floor price may be presented to a user after the user enters a listing price (LP).

After a particular time interval has elapsed (608), at least one of several other actions may be taken. For example, the particular time interval may be an average time between listing and sale (avg_sold_time) for a given item or similar item(s), or for a given category-and-brand pair, etc. The particular time interval may be a scaled factor of average time to sale, for example. Actions to be taken may include dropping the listing price by predetermined gradual steps, e.g., 5% per step (612). Another action that may be taken may include dividing the difference between LP and FP into a predetermined number of steps (610), e.g., three steps, and dropping the price gradually by each step uniformly as a fraction of the difference between LP and FP, according to some embodiments.

Figure 7:
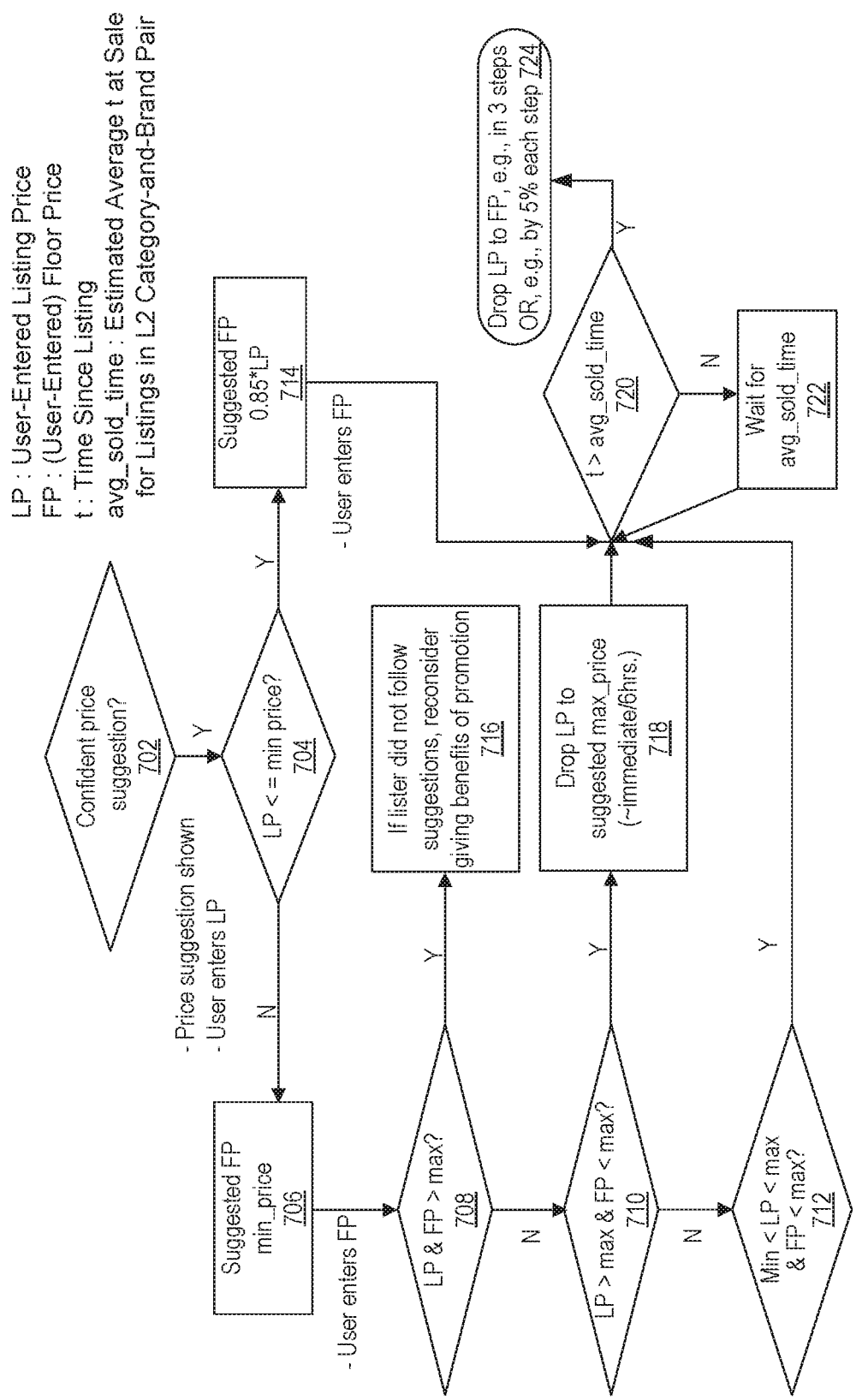
FIG. 7 depicts a logic flow for invoking use of a system of suggesting or recommending at least one next value, based on multiple ranges of values when there is a confident price suggestion in a target category, according to some embodiments.

FIG. 7 depicts a logic flow for invoking use of a system of suggesting or recommending at least one next value, based on multiple ranges of values when there is a confident price suggestion in a target category, according to some embodiments.

The logic flow diagram 700 shows an example of programmatic price reduction, having some elements in common with logic flow diagram 600 of FIG. 6 (compare 702 to 604, 714 to 606, 720 to 608, and 724 to 610 and 612), but adding additional checks for ranges of values into which various user-entered prices may be found with respect to suggested prices, and accounting for possible user-entered floor price. Additionally, logic flow diagram 700 may provide for additional flexibility on timing, e.g., timing offset(s) (718), for when programmatic price drops may occur, before waiting for the time since listing (age of the listed value, e.g., time since the list price was last reduced) to exceed average time to sale (and repeating in intervals of average time to sale or multiples thereof), for example.

Specifically, based on input information and conditions (e.g., 602 and 604 of FIG. 6), recommendations (e.g., predicted price or generated range based on the predicted price) may be made in accordance with the examples of FIG. 1 described above. Given a confident price suggestion in 702 (corresponding to 604; a target category may also be a condition, in some embodiments), various logic may be triggered depending on a list price and possible values of a floor price entered by a user (seller), in the examples of FIG. 7.

For example, at 704, if a user-entered listing price is already at or below the minimum price of a price range generated based on a predicted value from FIG. 1, then the user may not need prompting to reduce the price further at the time of sale. A predetermined floor price may be suggested at 714, similarly to 606 in FIG. 6 as described above. If, for any reason, the item is still not sold after an average length of time has elapsed, smart pricing (automatically lowering price of the item), or a prompt to the user to lower the price automatically or manually, may be automatically provided to the user, according to some embodiments.

However, if the user-entered list price is greater than a minimum price of a range based on the predicted value, as determined at 704, then a floor price may be suggested at the minimum price of the range at 706. Responsive to further user input of a floor price, other conditions may be evaluated based on the list price and the floor price.

For example, if the list price and floor price are both above the maximum value of the range based on the predicted value (708), it may be assumed that the user listing the item is not heeding the suggestions provided by the system in the interest of increasing the likelihood of a sale within a reasonable time, and the system may therefore evaluate whether to provide any promotion to the listing, given that the listing may have an unreasonably high price (716).

Otherwise, if the floor price is in the suggested price range based on the predicted value, but the initial listing price is still above the maximum value (710), the system may suggest to the user to drop the listing price to the maximum price of the range. This suggestion may be immediately (e.g., before or upon creating the listing), or within a predetermined amount of time following creation of the listing, e.g., six hours in this example, but other predetermined amounts may be used in other implementations (718).

As a default option following from 706, if neither condition of 708 or 710 is met (712), then the listing may proceed in similar fashion as with 714 after the floor price is entered. For 720 and 724, these steps may proceed as with 608-612, and the process may repeat for multiples of the average sale time (722).

Figure 8:
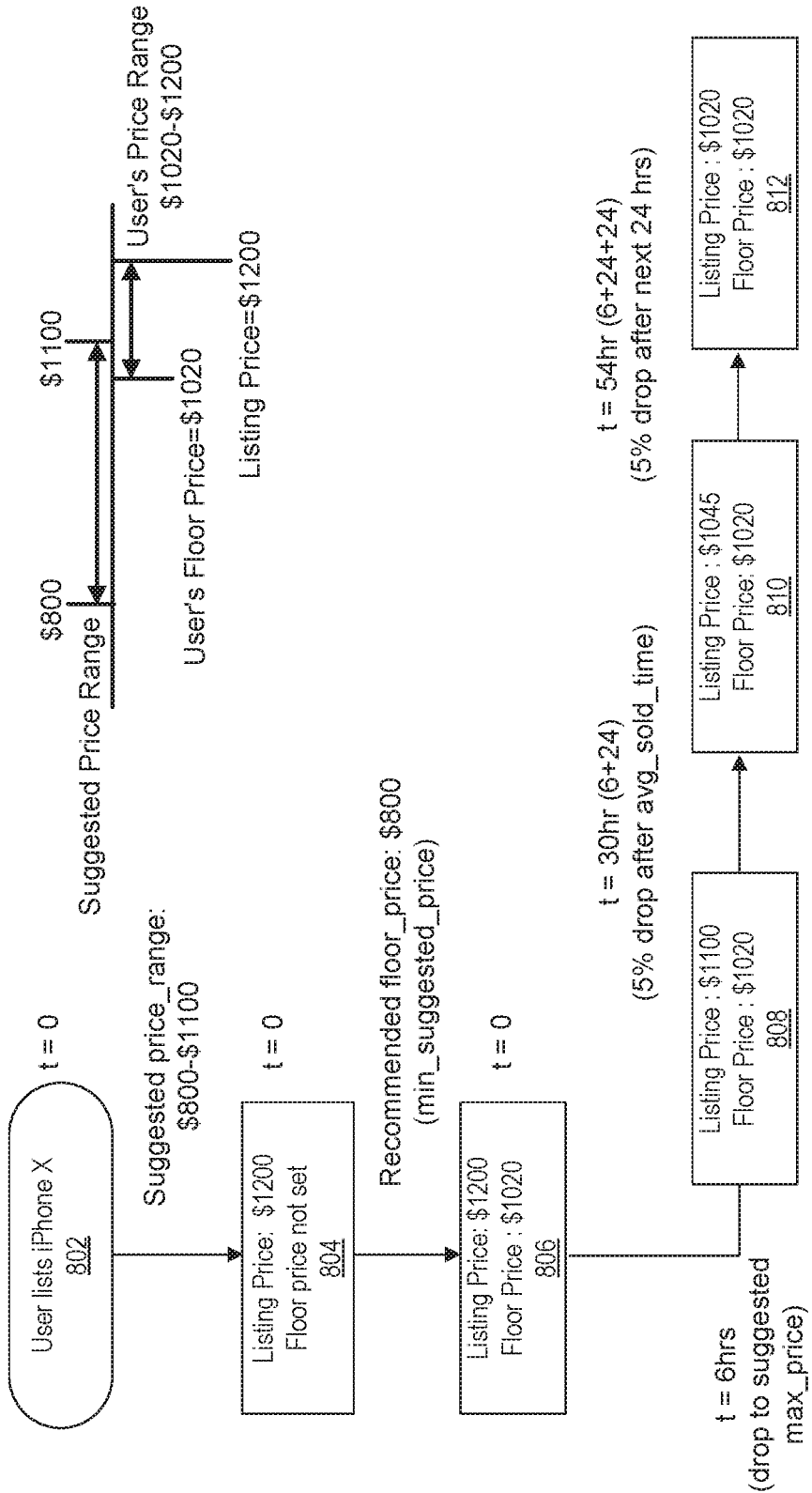
FIG. 8 illustrates an example use case of invoking a system of suggesting or recommending at least one next value, based on at least one category, at least one time-based statistic, and multiple ranges of values, according to some embodiments.

FIG. 8 illustrates an example use case of invoking a system of suggesting or recommending at least one next value, based on at least one category, at least one time-based statistic, and multiple ranges of values, according to some embodiments.

Flow diagram 800 represents an example use case in which a user lists a particular item (e.g., iPhone X) for sale (802) on a given platform. The user may be prompted to enter a price or range of prices, e.g., listing price (804) and floor price (806). A suggested price range may be computed and optionally presented to the user. For purposes of the example flow diagram 800, these prices may be entered, computed, and/or presented at t=0 (time at or before creation of an actual listing for sale). Once the listing has been published at t=0, this begins incrementing t with time. For the listed item or corresponding category, brand, category-and-brand pair, etc., of similar items (e.g., Apple smartphones), an average time to sell (avg_sold_time) may be calculated at 24 hours. This calculation may be based on moving-average analysis of historical data on the same platform and/or on other platforms, for example.

An initial input list price from the user (e.g., $1200) may be maintained for at least a given initial timing offset (e.g., 6 hours). The initial timing offset may be a predetermined value for the given platform, or may be calculated separately based on at least one factor of the listing price, category, brand, category-and-brand pair, and/or other potential factors. After the initial timing offset has elapsed, if the user-entered listing price is above the maximum suggested price in a suggested price range, the listing price may be dropped to the maximum suggested price (808), e.g., $1100, in this particular use case.

Following this last price drop, the listing price may remain steady for an interval of avg_sold_time (810), e.g., 24 hours, in this particular use case, after which the price may be dropped again, according to a particular rule, e.g., 5% step, uniform graduated step, etc. In the example of FIG. 8, a 5% step is used to drop the price from $1100 to $1045 at t=30 h (6+24 hours since initial listing).

After another interval of avg_sold_time, the programmatic price reduction may be iterated again (812), attempting the same 5% step of a price drop. Because another 5% price drop would reduce the listing price below the user-entered floor price, the listing price in this particular example use case will bottom out at the user's floor price of $1020 instead of a full 5% reduction from $1045, at t=54 h (6+24+24 hours since initial listing).

Other use cases may vary in terms of parameters for timing and price, as well as the extent to which user-entered values are maintained at various values of t. Separately, any quantitative or qualitative suggestion, or presentation thereof, or any manipulation of placement or promotion of listings in search engines or recommendation algorithms, may occur in coordination with, or independently from, any logic flow as shown in FIG. 8 or similar use cases.

Figure 9:
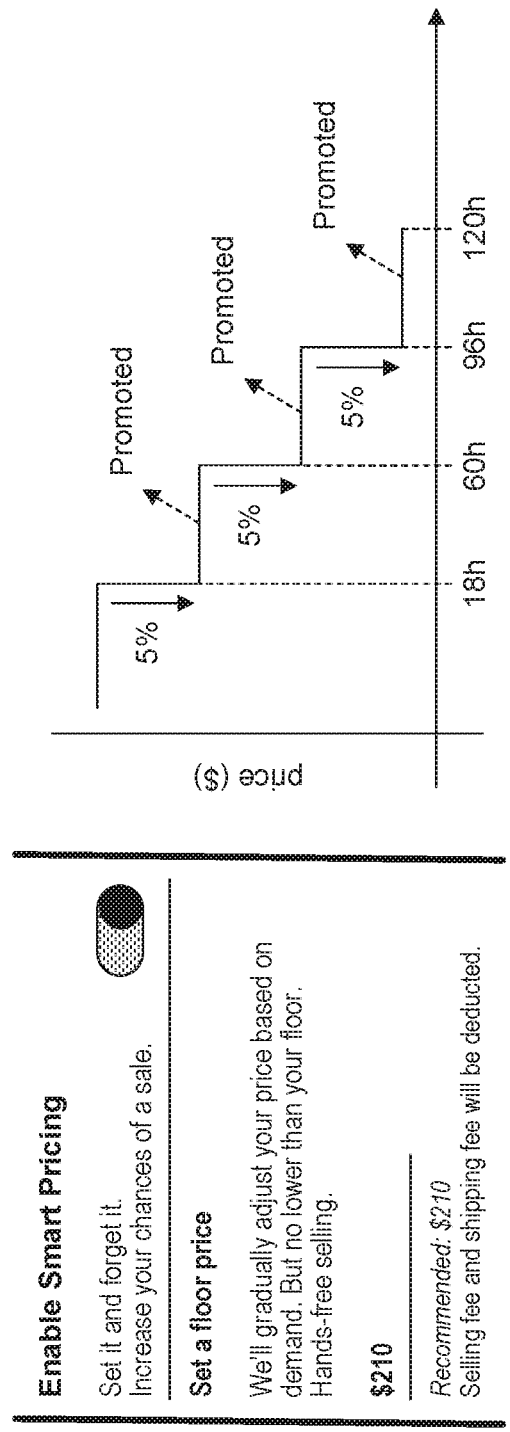
FIG. 9 illustrates a further example use case of configuring a system to use at least one next value, based on at least one category, at least one time-based statistic, and multiple ranges of values, according to some embodiments.

FIG. 9 illustrates a further example use case of configuring a system to use at least one next value, based on at least one category, at least one time-based statistic, and multiple ranges of values, according to some embodiments.

In this further example, shown at the left of FIG. 9 is a view of a user interface, according to an example embodiment, configured to allow a user to enable automated price adjustments (e.g., smart pricing) that may implement any of the algorithms described above to apply price drops to a given listing as time elapses before a sale is finalized. As the price is automatically lowered, the listing may be promoted in a given marketplaces search results and/or lists of items for browsing by potential buyers, according to some use cases.

Embodiments such as that shown in FIG. 9 may use any of the values, methods, or other techniques as described above, such as with respect to FIGS. 3-8. For example, price drops and promotions may be determined in accordance with the techniques described with respect to FIGS. 4 and 5. Depending on factors including whether a listing corresponds to a target category and a confident price suggestion, a floor price may be suggested and/or set, and the price of the listing may be dropped gradually in accordance with the various algorithms described in FIGS. 6 and 7, among other possible implementations within the scope of this disclosure.

Thus, as shown in FIG. 9 within the user interface, a price suggestion may be presented, which may correspond to a certain amount or percentage below an original list price (e.g., 15% below list price), while the user interface may still allow a user to adjust the floor price manually to another price if desired. Other messages may be displayed to the user, such as informational notices of additional costs or fees, or other warnings or suggestions if a manually entered price exceeds a threshold above or below a suggested price, for example.

In this further example, shown at the right of FIG. 9 is a plot of price over time, according to several graduated price drops over 120 hours in this particular example, assuming no sale within at least the first 96 hours. Price drops may follow patterns or algorithms such as those described with respect to FIGS. 6-8, but other configurations are possible. For example, the times of certain price drops may be at predetermined intervals relative to an initial listing for sale and/or previous price drop. Additionally, or alternatively, timing and/or amount (absolute or relative) of price drops may be determined dynamically in response to activity or demand of other users on at least one online marketplace, such as a platform where the listing is made available for sale.

Additionally, or alternatively, timing and/or rate (absolute amount or relative percentage) of price drops may be determined based at least in part on item metadata, which may include a category or description of the item in the listing, or dynamic counts of page views, search hits, or other interest in the particular listing of the item or of other items similar to the item in the particular listing. Thus, items in lower-volume or less-popular categories may have larger price drops recommended to offset low demand, whereas target categories in a high-demand market may increase likelihood of sales following relatively smaller price drops by comparison.

Figure 10:
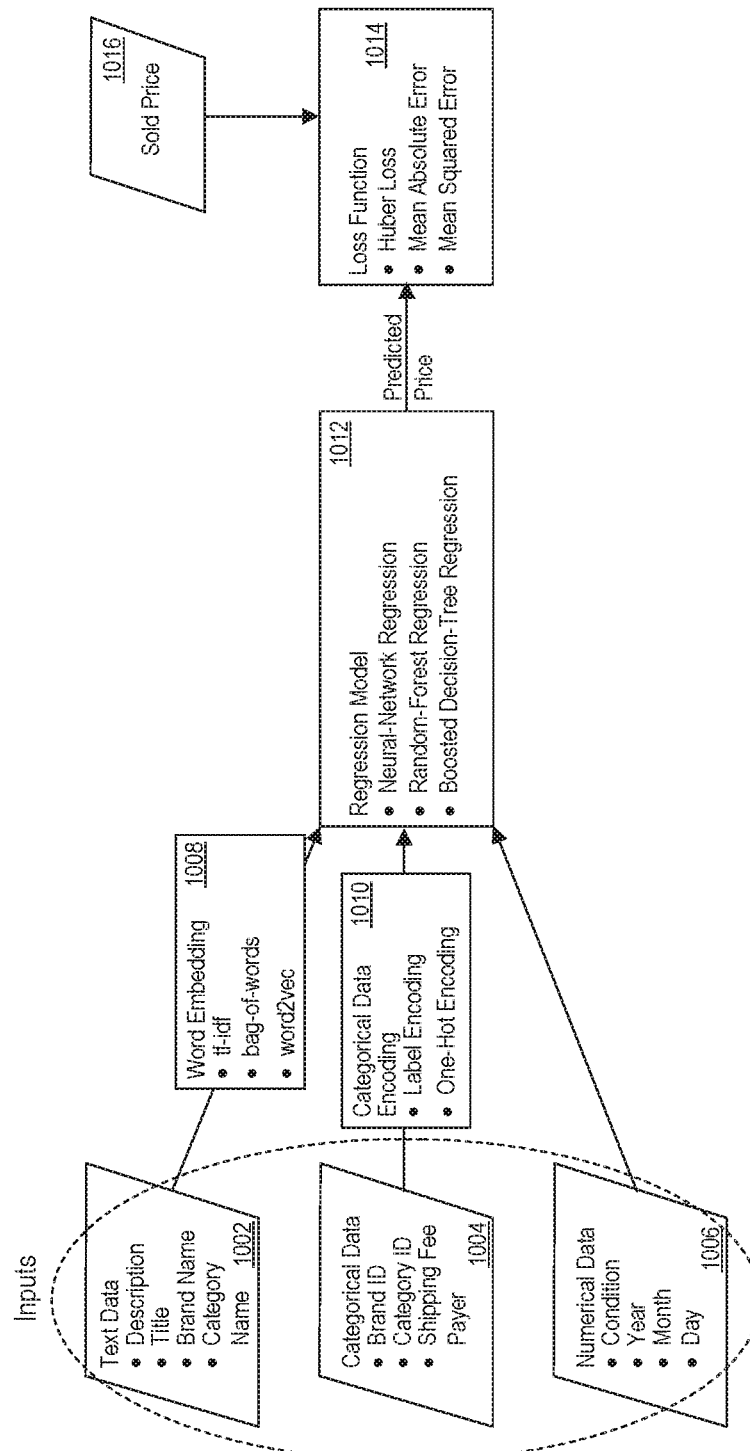
FIG. 10 depicts a logic flow of inputs and transforms in training at least one regression model for price prediction, according to some embodiments.

FIG. 10 depicts a logic flow of inputs and transforms in training at least one regression model for price prediction, according to some embodiments.

With reference to any of the predictions or estimates as noted herein, any of various regression models may be trained and used for different purposes or suitable applications, e.g., where neural-network regression, random-forest regression, boosted decision-tree regression, etc., may be desirable for a given use case. Any such regression model 1012 may be used to adjust or otherwise factor into a loss function 1014, e.g., Huber loss, mean absolute error (MAE), mean squared error (MSE), etc., which may in turn be used for predicting a value, such as an estimated sale price under a given set of conditions.

For inputs at a training stage, such as with machine learning or equivalent technologies, for example, a sold price 1016 such as from a data set of historical sold prices of actual items used as samples in a training set may be used for training and testing with respect to the at least one regression model and/or loss function for certain predictions or estimations of values, specifically prices, in this example. As input data for the training, a training set may include text data 1002 (e.g., description, title, brand name, category name, etc.), categorical data 1004 (e.g., brand ID, category ID, shipping fee payer, etc.), numerical data 1006 (dates, date ranges, other conditions, etc.), other such data, related data, metadata, or any combination of the above types or instances of training data for a given use case.

Additionally, some of the input data may be further processed for suitability with a given regression model. For example, any of the text data 1002, may be analyzed such as for word embedding 1008, which may use, e.g., term frequency-inverse document frequency (tf-idf), a bag-of-words model, word2vec, or any other type of analytics, statistical analysis, weighting, classification, natural-language processing (NLP), equivalent transformations or representations, or any combination of the above.

As another example, categorical data 1004 may be processed additionally such as via categorical data encoding 1010, which may include various types of coding or encoding, such as label encoding or one-hot encoding, among other similar processing for tagging or embedding, or any combination of the above. Equivalent processing of categorical data for machine learning (ML) is also within the scope of the enhanced techniques disclosed herein.

Using any or all of the above-mentioned description, among other possible techniques, at least one regression model 1012 may be trained to reduce a loss between predicted values and actual sold prices 1016 of the training data, with respect to at least one loss function 1014. Moreover, data samples may be weighted with respect to recency, such that the more recent samples in the loss function may be more reflective of recent market prices, for example.

Figure 11:
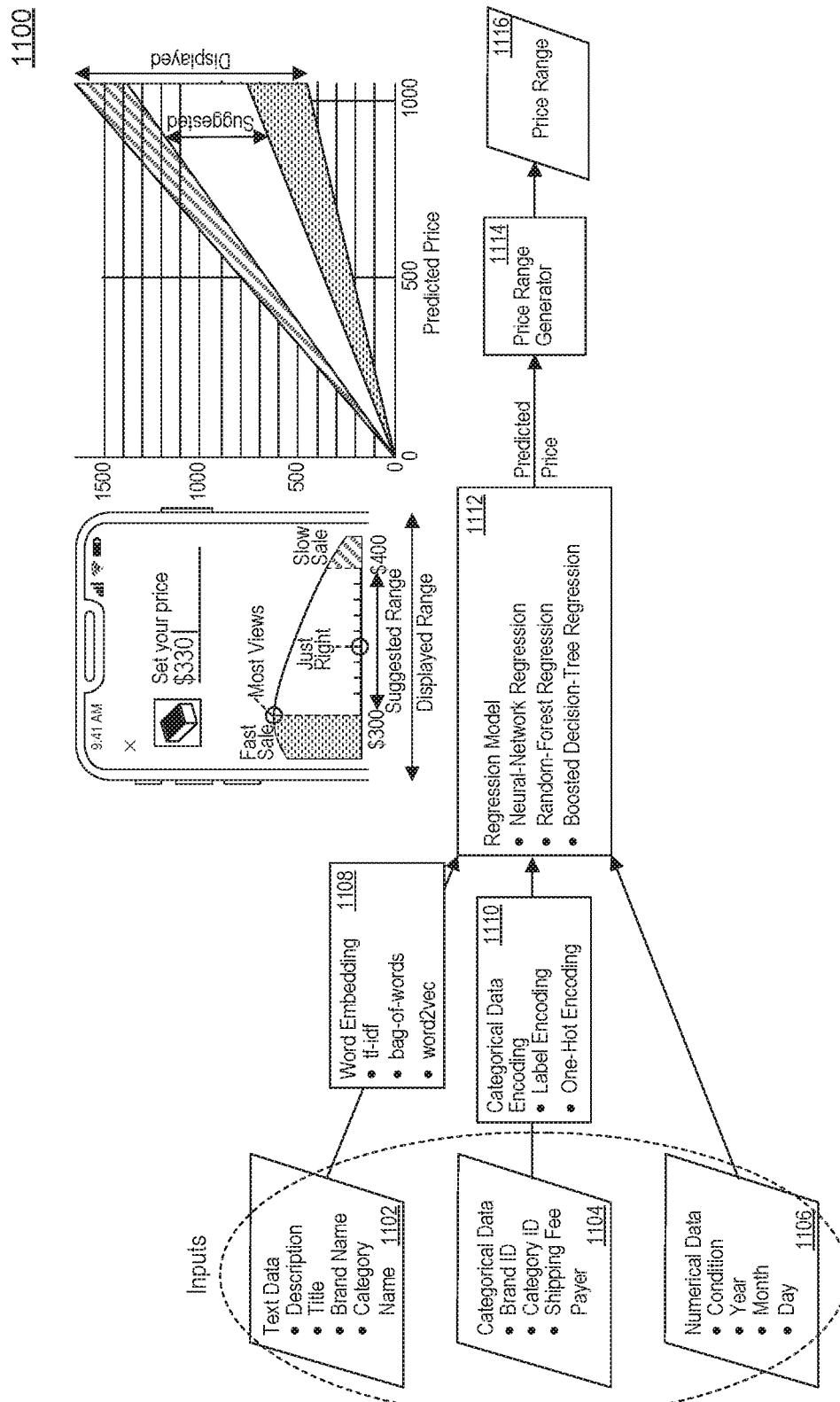
FIG. 11 illustrates a use case for at least one regression model for price prediction and generating a suggested price range around a predicted price according to some embodiments.

FIG. 11 illustrates a use case for at least one regression model for price prediction and generating a suggested price range around a predicted price according to some embodiments. For inputs in operation, as with training as described above with respect to machine learning or equivalent technologies, for example, input data may include text data 1102 (e.g., description, title, brand name, category name, etc.), categorical data 1104 (e.g., brand ID, category ID, shipping fee payer, etc.), numerical data 1106 (dates, date ranges, other conditions, etc.), other such data, related data, metadata, or any combination of the above for a given use case.

Additionally, some of the input data may be further processed for suitability with a given regression model. For example, any of the text data 1102, may be analyzed such as for word embedding 1108, which may use, e.g., term frequency-inverse document frequency (tf-idf), a bag-of-words model, word2vec, or any other type of analytics, statistical analysis, weighting, classification, natural-language processing (NLP), equivalent transformations or representations, or any combination of the above.

As another example, categorical data 1104 may be processed additionally such as via categorical data encoding 1110, which may include various types of coding or encoding, such as label encoding or one-hot encoding, among other similar processing for tagging or embedding, or any combination of the above. Equivalent processing of categorical data for machine learning (ML) is also within the scope of the enhanced techniques disclosed herein.

With reference to any of the predictions or estimates as noted herein, any of various regression models 1112 may be used for different purposes or suitable applications, e.g., where neural-network regression, random-forest regression, boosted decision-tree regression, etc., may be desirable for a given use case. Any such regression model 1112 may be used for predicting or estimating a value, for example, from which a range of values may be generated.

Width of a generated range of values around the predicted value may be based on various predetermined and/or dynamic factors that may be adjusted empirically to improve any aspect of the ranges, predictions, models, other components, or any combination of the above. An example factor that may be used for determining width of a price range may include sales volume or other related performance indicators or key performance indicators (KPIs), according to some embodiments.

FIG. 11 at the top right shows an example graph of price ranges with respect to a given predicted price, along with an example user interface (e.g., on a mobile device) depicting a suggested price (e.g., $330) within a suggested price range (e.g., $300-$400) for a preferred trade-off of price to time pending sale on an online marketplace, for example. Other prices outside the suggested range may be shown, indicating that higher prices may take a longer time to sell, and/or that lower prices may sell even more quickly, according to some embodiments.

FIG. 12 is a flowchart illustrating a method 1200 including machine-learning prediction or suggestion based on object identification, according to some embodiments. Method 1200 may be performed by processing logic that may comprise hardware (e.g., circuitry, dedicated logic, programmable logic, microcode, etc.), software (e.g., instructions executing on a processing device), or a combination thereof. Not all steps of method 1200 may be needed in all cases to perform the enhanced techniques disclosed herein. Further, some steps of method 1200 may be performed simultaneously, or in a different order from that shown in FIG. 12, as will be understood by a person of ordinary skill in the art.

Method 1200 shall be described with reference to FIGS. 1 and 4-13. However, method 1200 is not limited only to those example embodiments. The steps of method 1200 may be performed by at least one computer processor coupled to at least one memory device. An exemplary processor and memory device(s) are described below with respect to 1304 of FIG. 13. In some embodiments, method 1200 may be performed using system 100 of FIG. 1, which may further include at least one processor and memory such as those of FIG. 13.

In 1202, a processor such as processor 1304 may cross-reference, by an object-identification module, an identifier of a selected object with a list of known unique identifiers, the selected object being selected via a received selection. In some use cases, input may be received from a user, and such user input may include a selection of an object to be identified, e.g., from an image, description, or other sample data.

In some embodiments, additionally or alternatively, the selected object may be selected via a selection performed automatically by at least one processor 1304, e.g., using predetermined information, programmed logic, neural networks, machine learning, or other tools such as may relate to artificial intelligence, in some cases. Automatic selection may further be subject to manual confirmation by a user, in some implementations.

User input may be a description, title, name, or otherwise brief characterization or statement describing an item, as may be arbitrarily entered by a user, for example. Depending on the user and any category to which the item belongs, the input may be in response to a specific prompt (not shown), for example. The input may, additionally or alternatively, be based on non-textual data, e.g., from a sensor, camera, microphone, voice recognition, neural network or other artificial intelligence to generate descriptions based on other input or environmental factors, etc. The input may originate and be sent or received programmatically and/or in an automated fashion, such as by an application programming interface (API), for example, not necessarily by manual input from a user.

According to some embodiments, the object-identification module may be or comprise one or more units of any hardware, firmware, software, or combination thereof, configured to identify objects. Identification of objects may be carried out by referencing predetermined information, programmed logic, neural networks, machine learning, or other tools such as may relate to artificial intelligence, in some cases.

For example, an object-identification module may include, or be communicatively coupled with, a computer-vision module, which may include, or be communicatively coupled with, an image sensor or camera, e.g., to capture images in which objects may be recognized and/or identified. In the case of computer vision, live capture may not be required, as images for object identification may be obtained via other means, e.g., user uploads. Additionally, or alternatively, the computer-vision module or object-identification module may be part of, or interface with, an augmented-reality system, according to some use cases.

In some additional or alternative embodiments, objects may be identified by textual analysis, e.g., NLP, on user input, databases, other sources, public or private, or any combination thereof. Other sources of information for object identification include, but are not limited to, sound, voice, motion, temperature, or other sensor data, for example. In some use cases, the object-identification module may be part of a larger system for ontology.

Irrespective of how the object-identification module may be implemented, the object identification performed by the object-identification module may be configured to associate a given object (from input data, e.g., photograph, description, sound, etc.) with at least one identifier. An identifier may include any of various physical or descriptive characteristics. Other representations, e.g., vectors or arrays of data points of certain types, may be used for mapping and/or evaluating characteristic data in a way suitable for processing, e.g., with neural networks, according to some embodiments. One or more identifiers of a selected object, e.g., descriptions, may be cross-referenced with a known unique identifier, e.g., SKU or similar ID number, corresponding to a given object, for example. Cross-referencing may be implemented as indexing, dictionary lookup, relational operation, etc.

A known unique identifier may identify an object uniquely per a known standard, existing database, or other accepted metric, according to some embodiments. In accordance with such standards, metrics, or databases, a list of known unique identifiers may be formed, such as a directory or catalogue of items or listings, in some use cases, which may represent products that may currently or previously have been listed for sale.

For example, a known unique identifier may be any of a uniform, universal, and/or unique identifier, including but not limited to a stock-keeping unit (SKU), universal product code (UPC), uniform resource identifier (URI), uniform resource locator (URL), uniform resource name (URN), international standard book number (ISBN), Amazon standard item number (ASIN), document identifier, etc., to which a given item may be mapped, in some non-limiting example embodiments. Additionally or alternatively, a value may include a checksum, fingerprint, signature, digest, hash, cryptographic hash, etc., corresponding to at least one of the first input or second input (e.g., character string item description, specific text field for brand name, enumerated selector for size, model year, etc.), to track inputs and outputs and/or to determine matches or duplicates, for example.

In 1204, processor 1304 may retrieve, from at least one database, a set of values associated with the at least one identifier of the selected object, upon determining that the list of known unique identifiers comprises (includes) the identifier of the selected object. In other words, the selected object may have an uncertain identification, or at least may not be identified by the object-identification module as corresponding to a known unique identifier, for any reason.

In such cases, at least one database may be referenced, to retrieve a set of values associated with the at least one identifier or the selected object. Databases, as described here, may correspond to at least one of tables 130 and 132 of FIG. 1, for example, in which a SKU ID or SKU may represent a known unique identifier, according to some embodiments.

The at least one database may be related to the list of known unique identifiers, in some cases, but such relation is not necessary in all cases. The set of values associated with the at least one identifier of the selected object may be used by processor 1304 to relate or reference at least one characteristic of the selected object, corresponding to a known unique identifier, with characteristics of other objects that may be associated with known unique identifiers.

Whether via known unique identifiers or via other equivalent means, the set of values associated with the at least one identifier of the selected object may correspond to other information relating to the selected object, e.g., statistical data, performance metrics, time, price, sales volume, value correlations, etc., which may in turn be used to predict other values or sets thereof. Additionally, or alternatively, the set of values may be indicative, informative, or determinative of at least one category applicable to the selected object. More information about prediction is described with respect to 1206 further below.

In a particular non-limiting example, a set of values may be associated with a known unique identifier, such as in the tables shown in FIG. 1, in the form of ranges of actual sale prices per known unique identifier, in this case, per SKU. However, where a SKU or other known unique identifier is not known, per 1204, a similar set of values may be associated with at least one identifier (e.g., of a characteristic value), e.g., in at least one database.

Thus, unlike the examples using SKU tables or equivalent unique-identifier tables shown in FIG. 1, by referencing the at least one database, processor 1304 may derive a predicted value set, e.g., correlating to estimation or suggestion, of a set of values associated with the selected object. This may allow for improved reliability of predicted value sets, even in cases of selected objects for which a known unique identifier cannot be determined, such as per 1202 and 1204. Derivation of the predicted value set is described with respect to 1206 further below.

In 1206, processor 1304 may perform at least one machine-learning (ML) algorithm to derive a predicted-value set based at least in part on the set of values associated with the identifier of the selected object, and based at least in part on at least one category applicable to the selected object. In a non-limiting example, such as is shown in FIG. 1, ML-based estimation may be performed in the absence of a SKU or other unique identifier for a selected object. In the embodiment depicted in FIG. 1, ML-based estimation may be performed in the absence of (or irrespective of) availability of predetermined logic rules for estimation, which may depend on types of associated data available in the at least one database, or the at least one category applicable to the selected object.

For example, ML-based estimation may use as input, any of several relatively large data sets (e.g., compared with manually curated data sets) that may correspond to the at least one identifier that may be associated with characteristic data representing the selected object and/or the at least one category applicable to the selected object. By way of further detail, in a non-limiting example use case, the at least one category may be a genus of objects identified by the object-identification module, as opposed to a unique object identified by a known unique identifier. The characteristic data may be an objective representation of other quantitative and/or qualitative values or attributes pertaining to the selected object.

To improve reliability, accuracy, reproducibility, etc., of predicted value sets, multiple dimensions of characteristic data (identifiers) and/or layers of neural networks may be included or utilized in the ML-based estimation. In some embodiments, supervised or unsupervised learning, based on manually curated or automatically generated data sets (or a combination thereof), may be used as training for a given algorithm to be performed with ML-based estimation. Because ML-based estimation may, for some use cases, be understood as less reliable than some other techniques, e.g., based on unique identifiers, logic rules, statistical analysis, etc., an additional check of the output predicted values may be used, in the form of a condition based on a confidence interval, as described in further detail with 1208 below.

In 1208, processor 1304 may determine that the predicted-value set satisfies a predetermined confidence condition. For example, the predicted-value set may be based on, or fed into, another model that may have specific tolerances for likelihoods of predictions becoming true. If the output of ML-based estimation results in a predicted-value set that has a confidence interval out of range (e.g., not likely enough to be accurate and/or based on insufficient input data or algorithmic processing), then the ML-based estimation results may be discarded, and a related software process flow (e.g., user interface for a seller to list an item) may proceed without estimation, or may attempt statistical estimation as a backup, according to some embodiments. However, if the confidence condition is met, such that the predicted-value set is expected to be sufficiently reliable or accurate, then output may be processed in any of various ways, such as described by non-limiting examples with respect to 1210 below.

In 1210, processor 1304 may output at least part of the predicted-value set. The predicted-value set may include or indicate a range of values, for example, at different confidence intervals, or at different statistical frequencies, according to some embodiments. Ranges of values may be defined by orders, series, rankings, representative values, or composite statistical measures such as minimum, maximum, median, quartiles, or quartile ranges (e.g., interquartile range, minimum to first quartile, first quartile to median, median to third quartile, third quartile to maximum, etc.), for example.

Those skilled in the art will appreciate calculations of rankings may be based on other divisions or intermediate values, in addition to or instead of median and quartiles, e.g., tertiles, quintiles, percentiles, or other quantiles, according to some embodiments. Other differences, range, mode, variance, standard deviation, correlation values, covariance, cross correlation, etc., may also be included. In some embodiments, any of the above statistical measures or their equivalents may be used in addition to or instead of ML-based predictions, serving a role of an estimate or suggestion in use cases where ML algorithms or processing may be unavailable for any reason, according to some use cases.

In similar context, index, a composite statistic, or composite measure, may refer to any of a mean, median, mode, variance, standard deviation, range, minimum, maximum, quintile, or other ranking from among a set of related values, for example. The output of 1210, however, may be a single composite value, in some cases, or a logical determination of whether a predicted value (or composite value thereof) is equal to, greater than, or less than a predetermined threshold value.

In some use cases, for estimation or suggestion of original or adjusted list prices in product listings for sale, a predicted value set may represent at least one trend or boundary inferred from historical data or from extrapolated regression points, and may be used to generate a prediction of an estimated sale price, a suggestion of a price likely (or more likely) to result in a sale within a predetermined time period, a prediction of whether a given price may likely result in a sale within the predetermined time period (within a given confidence interval), or a combination thereof.

At least one regression model, or equivalent ML model, may be used for extrapolating predicted values or predicted-value sets over time, e.g., based at least in part on historical data, at least one object category, seasonal data, independent secular trends, or any combination thereof, to name a few non-limiting examples. Time-based extrapolations may be updated ad hoc, in response to the determination (automatically determining) that a list of known unique identifiers lacks a given identifier of a selected object, for example.

In some embodiments, any models, regressions, time-based extrapolations, predicted values, or predicted-value sets may be updated periodically, at least for certain categories or classes of object identifiers that are likely to correspond to input received from users and unlikely to correspond to any entry of a list of known identifiers, e.g., certain types of generic clothing, custom-made craft goods, personalized or one-of-a-kind items, etc. Periodic updates for likely inputs that may lead to ML-based estimation may result in improved speed and accuracy for retrieval of values and/or generation of outputs from performance of certain ML algorithms, for example.

Additionally, or alternatively, the output of at least part of the predicted-value set may be a quantitative difference between a predicted value (or composite value thereof) and a predetermined threshold, such as by how much the predetermined threshold value is different from the predicted value or composite value thereof. Thus, according to some embodiments, the output of at least part of the predicted-value set may be or include a suggestion of a value within an expected range of values (e.g., determined by the ML-based estimation of 1206) and/or recommendation including a value or expected range of values for which the selected object may be better suited (e.g., determined by the confidence condition of 1208, a price at which the selected object is more likely to sell).

For example, two values may define a range of prices within which a given item (e.g., input of selected object, or selection received at 1202) has at least a certain probability of selling within a given period of time (duration and/or specific dates). Separately, a different range of prices may be determined for probability of completing a sale irrespective of time. Additionally, or alternatively, according to some embodiments, a first value may represent a highest price for a given probability of sale irrespective of time, and a second value may be determined to be a highest price for a given probability of sale within a given time constraint, in some use cases. As time elapses, ranges of prices may be adjusted, as described elsewhere herein, e.g., in accordance with FIGS. 4-11.

Method 1200 is disclosed in the order shown above in this exemplary embodiment of FIG. 12. In practice, however, the operations disclosed above, alongside other operations, may be executed sequentially in any order, or they may alternatively be executed concurrently, with more than one operation being performed simultaneously, or any combination of the above.

Example Computer System

Figure 13:
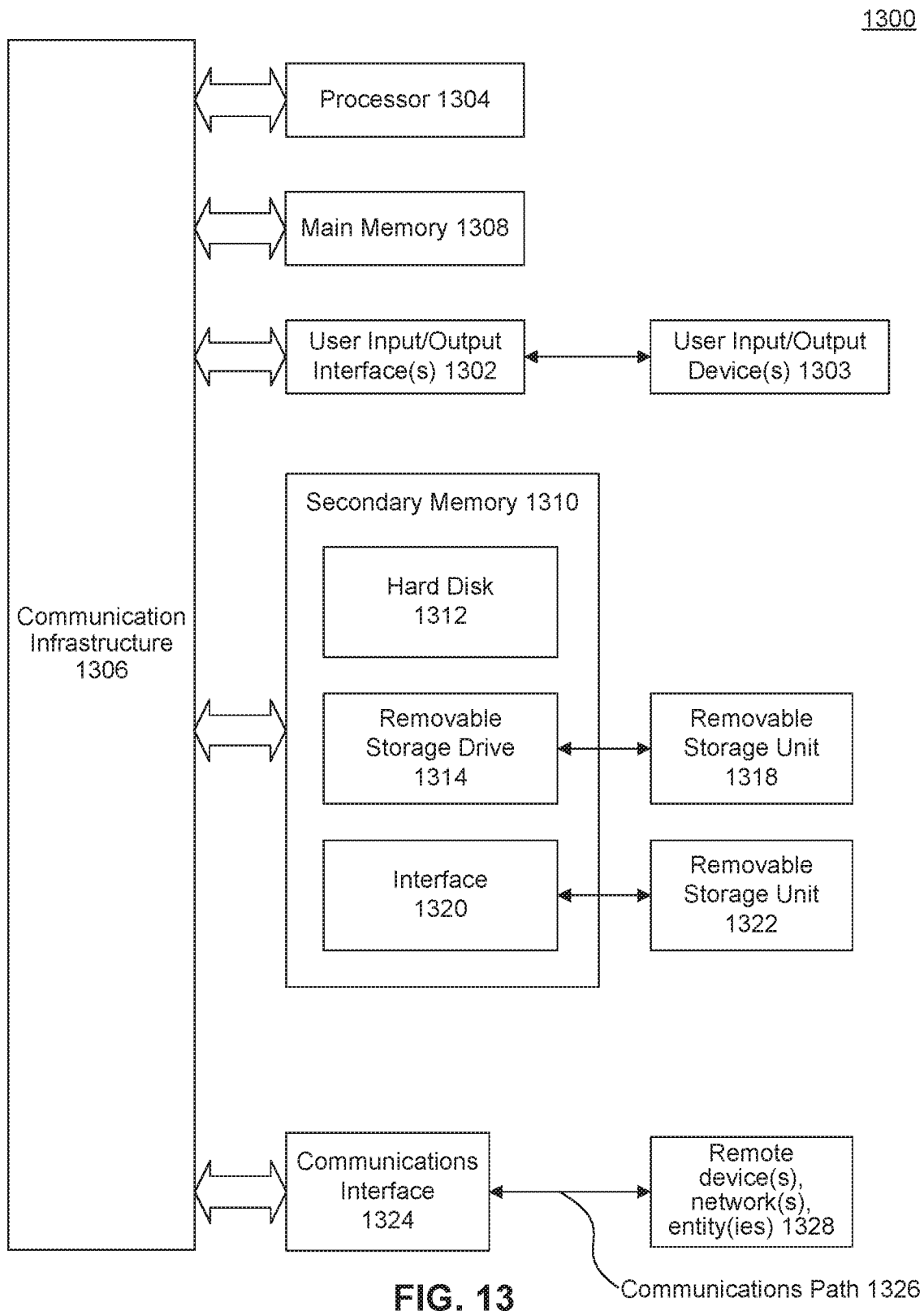
FIG. 13 illustrates a block diagram of a general purpose computer that may be used to perform various aspects of the present disclosure.

Various embodiments may be implemented, for example, using one or more computer systems, such as computer system 1300 shown in FIG. 13. One or more computer systems 1300 may be used, for example, to implement any of the embodiments discussed herein, as well as combinations and sub-combinations thereof.

Computer system 1300 may include one or more processors (also called central processing units, or CPUs), such as a processor 1304. Processor 1304 may be connected to a bus or communication infrastructure 1306.

Computer system 1300 may also include user input/output device(s) 1303, such as monitors, keyboards, pointing devices, etc., which may communicate with communication infrastructure 1306 through user input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image-recognition and machine-learning aspects described herein.

Additionally, one or more of processors 1304 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or secondary memory 1310. Secondary memory 1310 may include, for example, a main storage drive 1312 and/or a removable storage device or drive 1314. Main storage drive 1312 may be a hard disk drive or solid-state drive, for example. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/or any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communication path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 1300 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for updating data, the computer-implemented method comprising:
  cross-referencing, by an object-identification module invoked via at least one computer processor, an identifier of a selected object with a list of known unique identifiers, wherein the selected object is selected automatically via a received selection;
  retrieving, via the at least one computer processor, from at least one database, a set of values associated with the identifier of the selected object, upon determining that the list of known unique identifiers comprises the identifier of the selected object;
  performing, via the at least one computer processor, at least one machine-learning (ML) algorithm to derive a predicted-value set based at least in part on the set of values associated with the identifier of the selected object, and based at least in part on at least one category applicable to the selected object;
  determining, via the at least one computer processor, whether the predicted-value set satisfies a predetermined confidence condition within a confidence interval for closing a sale of the selected object within a particular time window;
  discarding, via the at least one computer processor, the predicted-value set in response to the confidence interval being out of a range;
  outputting, via the at least one computer processor, at least part of the predicted-value set, wherein the predicted-value set includes a range of values at different confidence intervals;
  receiving, via the at least one computer processor, a listed value of the selected object;
  determining, via the at least one computer processor, a floor value of the selected object based on the listed value in response to a determination that there is no price suggestion within the predicted-value set satisfying the predetermined confidence condition; and
automatically calculating and outputting, via the at least one computer processor, the floor value.

2. The computer-implemented method of claim 1, wherein the listed value is adjusted based at least in part on the predicted-value set, an age of the listed value, and metadata associated with the listed value.

3. The computer-implemented method of claim 1, wherein the predicted-value set comprises at least two values defining a range of intermediate values.

4. The computer-implemented method of claim 1, wherein the predicted-value set corresponds to a time-based extrapolation of the set of values associated with the identifier of the selected object.

5. The computer-implemented method of claim 1, wherein the determining the floor value comprises determining the floor value based on a minimum value of the predicted-value set in response to a determination that there is the price suggestion within the predicted-value set satisfying the predetermined confidence condition and the listed value being less than or equal to the minimum value of the predicted-value set.

6. The computer-implemented method of claim 1, wherein the determining the floor value comprises determining the floor value based on the listed value in response to a determination that there is the price suggestion within the predicted-value set satisfying the predetermined confidence condition and the listed value being greater than a minimum value of the predicted-value set.

7. The computer-implemented method of claim 1, further comprising:
reducing, via the at least one computer processor, the listed value to the floor value over time.

8. A non-transitory computer-readable medium storing instructions that, when executed by at least one computer processor, cause the at least one computer processor to perform operations comprising:
cross-referencing, by an object-identification module, an identifier of a selected object with a list of known unique identifiers, wherein the selected object is selected automatically via a received selection;
retrieving, from at least one database, a set of values associated with the identifier of the selected object, upon determining that the list of known unique identifiers comprises the identifier of the selected object;
performing at least one machine-learning (ML) algorithm to derive a predicted-value set based at least in part on the set of values associated with the identifier of the selected object, and based at least in part on at least one category applicable to the selected object;
determining whether the predicted-value set satisfies a predetermined confidence condition within a confidence interval for closing a sale of the selected object within a particular time window;
discarding the predicted-value set in response to the confidence interval being out of a range;
outputting at least part of the predicted-value set, wherein the predicted-value set includes a range of values at different confidence intervals;
receiving a listed value of the selected object;
determining a floor value of the selected object based on the listed value in response to a determination that there is no price suggestion within the predicted-value set satisfying the predetermined confidence condition; and
automatically calculating and outputting the floor value.

9. The non-transitory computer-readable medium of claim 8, wherein the listed value is adjusted based at least in part on the predicted-value set, an age of the listed value, and metadata associated with the listed value.

10. The non-transitory computer-readable medium of claim 8, wherein the predicted-value set comprises at least two values defining a range of intermediate values.

11. The non-transitory computer-readable medium of claim 8, wherein the determining the floor value comprises determining the floor value based on a minimum value of the predicted-value set in response to a determination that there is the price suggestion within the predicted-value set satisfying the predetermined confidence condition and the listed value being less than or equal to the minimum value of the predicted-value set.

12. The non-transitory computer-readable medium of claim 8, wherein the determining the floor value comprises determining the floor value based on the listed value in response to a determination that there is no price suggestion within the predicted-value set satisfying the predetermined confidence condition and the listed value being greater than a minimum value of the predicted-value set.

13. The non-transitory computer-readable medium of claim 8, wherein the operations further comprise:
reducing the listed value to the floor value over time.

14. A system, comprising:
a memory; and
at least one computer processor coupled to the memory and configured to perform operations comprising:
cross-referencing, by an object-identification module, an identifier of a selected object with a list of known unique identifiers, wherein the selected object is automatically selected via a received selection;
retrieving, from at least one database, a set of values associated with the identifier of the selected object, upon determining that the list of known unique identifiers comprises the identifier of the selected object;
performing at least one machine-learning (ML) algorithm to derive a predicted-value set based at least in part on the set of values associated with the identifier of the selected object, and based at least in part on at least one category applicable to the selected object;
determining whether the predicted-value set satisfies a predetermined confidence condition within a confidence interval for closing a sale of the selected object within a particular time window;
discarding the predicted-value set in response to the confidence interval being out of a range;
outputting at least part of the predicted-value set, wherein the predicted-value set includes a range of values at different confidence intervals;
receiving a listed value of the selected object;
determining a floor value of the selected object based on the listed value in response to a determination that there is no price suggestion within the predicted-value set satisfying the predetermined confidence condition; and
automatically calculating and outputting the floor value.

15. The system of claim 14, wherein the listed value is adjusted based at least in part on the predicted-value set, an age of the listed value, and metadata associated with the listed value.

16. System of claim 14, wherein the predicted-value set comprises at least two values defining a range of intermediate values.

17. The system of claim 14, wherein the predicted-value set corresponds to a time-based extrapolation of the set of values associated with the identifier of the selected object.

18. The system of claim 14, wherein the determining the floor value comprises determining the floor value based on a minimum value of the predicted-value set in response to a determination that there is the price suggestion within the predicted-value set satisfying the predetermined confidence condition and the listed value being less than or equal to the minimum value of the predicted-value set.

19. The system of claim 14, wherein the determining the floor value comprises determining the floor value based on the listed value in response to a determination that there is the price suggestion within the predicted-value set satisfying the predetermined confidence condition and the listed value being greater than a minimum value of the predicted-value set.

20. The system of claim 14, wherein the operations further comprise:

reducing the listed value to the floor value over time.

* * * * *